United States Patent
Jung et al.

(10) Patent No.: US 11,589,393 B2
(45) Date of Patent: *Feb. 21, 2023

(54) RANDOM ACCESS CONFIGURATION

(71) Applicant: Lenovo (Singapore) PTE. LTD., New Tech Park (SG)

(72) Inventors: Hyejung Jung, Northbrook, IL (US); Vijay Nangia, Woodridge, IL (US); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 124 days.

This patent is subject to a terminal disclaimer.

(21) Appl. No.: 17/121,489

(22) Filed: Dec. 14, 2020

(65) Prior Publication Data

US 2021/0100041 A1 Apr. 1, 2021

Related U.S. Application Data

(63) Continuation of application No. 16/195,319, filed on Nov. 19, 2018, now Pat. No. 10,869,338.

(Continued)

(51) Int. Cl.
*H04W 74/08* (2009.01)
*H04W 48/08* (2009.01)
(Continued)

(52) U.S. Cl.
CPC ....... *H04W 74/0833* (2013.01); *H04W 48/08* (2013.01); *H04W 56/001* (2013.01);
(Continued)

(58) Field of Classification Search
None
See application file for complete search history.

(56) References Cited

U.S. PATENT DOCUMENTS 10,523,347 B2 * 12/2019 Hwang ............... H04B 17/309
10,880,032 B2 * 12/2020 Yi ....................... H04B 7/0639
(Continued)

FOREIGN PATENT DOCUMENTS

WO WO-2016072901 A1 * 5/2016 .......... H04W 56/005
WO WO-2019095222 A1 * 5/2019 ........ H04W 72/0453

OTHER PUBLICATIONS

Huawei, Hisilicon, "BWP issues for EN-DC completion", 3GGP TSG-RAN WG2 Meeting #100, R2-1712322, Nov. 27-Dec. 1, 2017, pp. 1-6, Reno, USA.
(Continued)

*Primary Examiner* — Ajit Patel
(74) *Attorney, Agent, or Firm* — Kunzler Bean & Adamson

(57) ABSTRACT

Apparatuses, methods, and systems are disclosed for random access configuration. One method includes receiving a first cell-defining synchronization signal block on a carrier. The method includes synchronizing to the first cell-defining synchronization signal block. The method includes receiving a first system information message associated with a first serving cell of the first cell-defining synchronization signal block. The first system information message includes a first random access channel configuration. The method includes receiving a bandwidth part configuration via a dedicated message from the first serving cell that indicates a bandwidth part configured with a second random access channel configuration. The method includes performing random access according to the second random access channel configuration in the bandwidth part of the first serving cell.

20 Claims, 8 Drawing Sheets

Related U.S. Application Data

(60) Provisional application No. 62/588,348, filed on Nov. 18, 2017.

(51) Int. Cl.
*H04W 72/08* (2009.01)
*H04W 72/0446* (2023.01)
*H04W 56/00* (2009.01)
*H04W 74/00* (2009.01)

(52) U.S. Cl.
CPC ..... *H04W 72/0446* (2013.01); *H04W 72/085* (2013.01); *H04W 74/002* (2013.01); *H04W 74/0891* (2013.01)

(56) References Cited

U.S. PATENT DOCUMENTS

| | | |
|---|---|---|
| 2013/0077582 A1 | 3/2013 | Kim et al. |
| 2016/0338056 A1 | 11/2016 | Xue et al. |
| 2016/0338109 A1 | 11/2016 | Rahman et al. |
| 2017/0257891 A1 | 9/2017 | Lindoff et al. |
| 2018/0139778 A1* | 5/2018 | Chou ............ H04W 74/04 |
| 2018/0160448 A1 | 6/2018 | Blankenship et al. |
| 2019/0045549 A1* | 2/2019 | Wu ............ H04W 72/085 |
| 2019/0223094 A1 | 7/2019 | Ingale et al. |
| 2019/0289639 A1 | 9/2019 | Frenger et al. |

OTHER PUBLICATIONS

Samsung, "Remaining details on SS burst set related procedures", 3GPP TSG RAN WG1 Meeting NR#3, R1-1715908, Sep. 18-21, 2017, pp. 1-10, Nagoya, Japan.

Mediatek Inc., "Reamining Details on Bandwidth Part Operation in NR", 3GPP TSG RAN WG1 Meeting 90 bis, R1-1718327, Oct. 9-13, 2017, pp. 1-14, Prague, CZ.

PCT/IB2018/001425, "Notification of Transmittal of the International Search Report and the Written Opinion of the International Searching Authority, or the Declaration", International Searching Authority, dated Feb. 26, 2019, pp. 1-15.

* cited by examiner

RANDOM ACCESS CONFIGURATION

CROSS-REFERENCE TO RELATED APPLICATIONS

This application is a continuation application of U.S. patent application Ser. No. 16/195,319 filed on Nov. 19, 2018, which claims priority to U.S. Patent Application Ser. No. 62/588,348 entitled "RANDOM ACCESS AND MOBILITY HANDLING" and filed on Nov. 18, 2017 for Hyejung Jung, all of which are incorporated herein by reference in their entirety.

FIELD

The subject matter disclosed herein relates generally to wireless communications and more particularly relates to random access configuration.

BACKGROUND

The following abbreviations are herewith defined, at least some of which are referred to within the following description: Third Generation Partnership Project ("3GPP"), $5^{th}$ Generation ("5G"), Positive-Acknowledgment ("ACK"), Angle of Arrival ("AoA"), Angle of Departure ("AoD"), Additional MPR ("A-MPR"), Access Point ("AP"), Binary Phase Shift Keying ("BPSK"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), Identity or Identifier ("ID"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Machine Type Communication ("MTC"), massive MTC ("mMTC"), Multiple Input Multiple Output ("MIMO"), Maximum Power Reduction ("MPR"), Multi User Shared Access ("MUSA"), Narrowband ("NB"), Negative-Acknowledgment ("NACK") or ("NAK"), Next Generation Node B ("gNB"), Network Entity ("NE"), Non-Orthogonal Multiple Access ("NOMA"), New Radio ("NR"), Orthogonal Frequency Division Multiplexing ("OFDM"), Open-Loop ("OL"), Other System Information ("OSI"), Power Angular Spectrum ("PAS"), Power Control ("PC"), Primary Cell ("PCell"), Physical Cell ID ("POD"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Physical Hybrid ARQ Indicator Channel ("PHICH"), Power Headroom ("PH"), Power Headroom Report ("PHR"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Radio Access Network ("RAN"), Radio Access Technology ("RAT"), Radio Resource Control ("RRC"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Signal-to-Interference-Plus-Noise Ratio ("SINR"), System Information Block ("SIB"), Synchronization Signal ("SS"), Synchronization Signal Block ("SSB"), Supplementary Uplink ("SUL"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, a random access channel configuration may be used. In such networks, a device may not know which configuration to use.

BRIEF SUMMARY

Methods for random access configuration are disclosed. Apparatuses and systems also perform the functions of the apparatus. One embodiment of a method includes receiving a first cell-defining synchronization signal block on a carrier. In some embodiments, the method includes synchronizing to the first cell-defining synchronization signal block. In certain embodiments, the method includes receiving a first system information message associated with a first serving cell of the first cell-defining synchronization signal block. In such embodiments, the first system information message includes a first random access channel configuration. In various embodiments, the method includes receiving a bandwidth part configuration via a dedicated message from the first serving cell that indicates a bandwidth part configured with a second random access channel configuration. In one embodiment, the method includes performing random access according to the second random access channel configuration in the bandwidth part of the first serving cell.

One apparatus for random access configuration includes a receiver that receives a first cell-defining synchronization signal block on a carrier. In certain embodiments, the apparatus includes a processor that synchronizes to the first cell-defining synchronization signal block, wherein: the receiver: receives a first system information message associated with a first serving cell of the first cell-defining synchronization signal block, wherein the first system information message includes a first random access channel configuration; and receives a bandwidth part configuration via a dedicated message from the first serving cell that indicates a bandwidth part configured with a second random access channel configuration; and the processor performs random access according to the second random access channel configuration in the bandwidth part of the first serving cell.

One method for random access configuration includes transmitting a first cell-defining synchronization signal block on a carrier. In some embodiments, the method includes transmitting a first system information message associated with a first serving cell of the first cell-defining synchronization signal block. In such embodiments, the first system information message includes a first random access channel configuration. In certain embodiments, the method includes transmitting a bandwidth part configuration via a dedicated message from the first serving cell that indicates a bandwidth part configured with a second random access channel configuration. In such embodiments, random access is performed according to the second random access channel configuration in the bandwidth part of the first serving cell.

One apparatus for random access configuration includes a transmitter that: transmits a first cell-defining synchronization signal block on a carrier; transmits a first system information message associated with a first serving cell of the first cell-defining synchronization signal block, wherein the first system information message includes a first random access channel configuration; and transmits a bandwidth part configuration via a dedicated message from the first serving cell that indicates a bandwidth part configured with a second random access channel configuration, wherein random access is performed according to the second random access channel configuration in the bandwidth part of the first serving cell.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
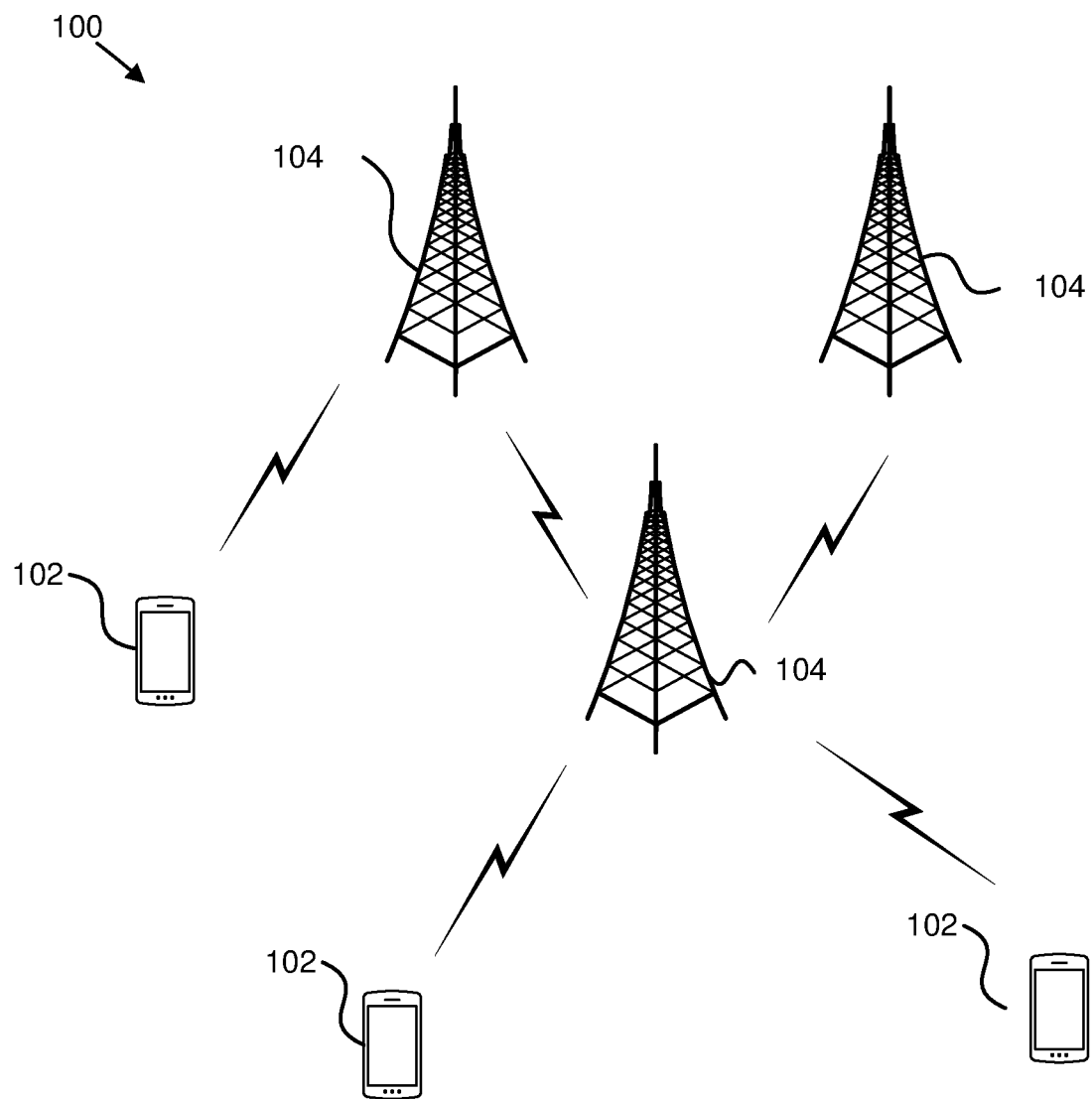
FIG. 1 is a schematic block diagram illustrating one embodiment of a wireless communication system for random access configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for random access configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive a first cell-defining synchronization signal block on a carrier. In some embodiments, the remote unit 102 may synchronize to the first cell-defining synchronization signal block. In certain embodiments, the remote unit 102 may receive a first system information message associated with a first serving cell of the first cell-defining synchronization signal block. In such embodiments, the first system information message includes a first random access channel configuration. In various embodiments, the remote unit 102 may receive a bandwidth part configuration via a dedicated message from the first serving cell that indicates a bandwidth part configured with a second random access channel configuration. In one embodiment, the remote unit 102 may perform random access according to the second random access channel configuration in the bandwidth part of the first serving cell. Accordingly, the remote unit 102 may be used for random access configuration.

In certain embodiments, a network unit 104 may transmit a first cell-defining synchronization signal block on a carrier. In some embodiments, the network unit 104 may transmit a first system information message associated with a first serving cell of the first cell-defining synchronization signal block. In such embodiments, the first system information message includes a first random access channel configuration. In certain embodiments, the network unit 104 may transmit a bandwidth part configuration via a dedicated message from the first serving cell that indicates a bandwidth part configured with a second random access channel configuration. In such embodiments, random access is performed according to the second random access channel configuration in the bandwidth part of the first serving cell. Accordingly, the network unit 104 may be used for random access configuration.

Figure 2:
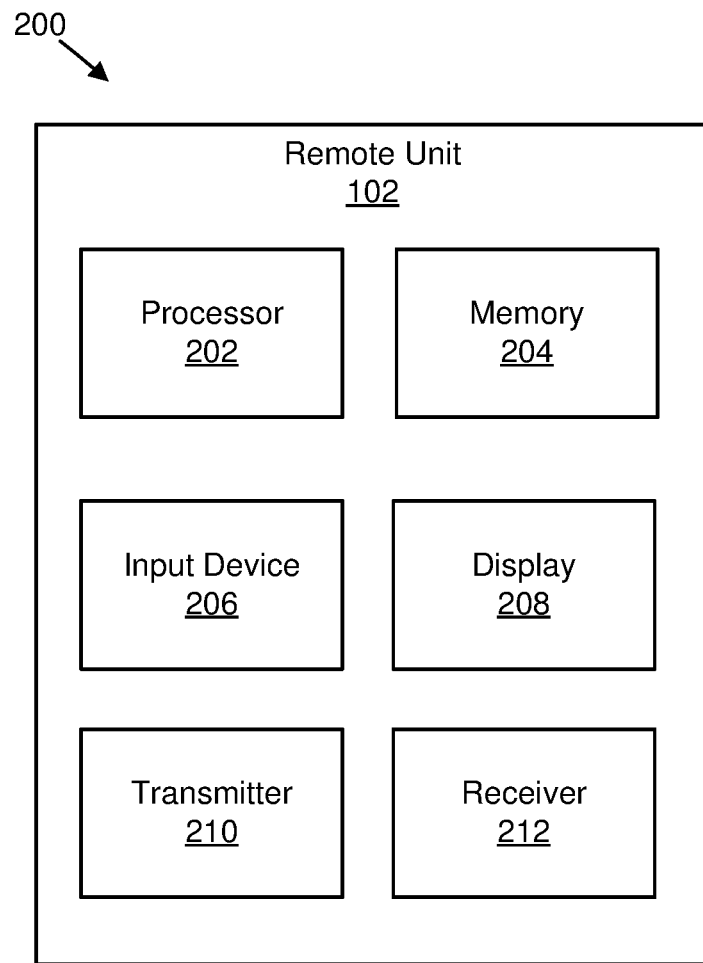
FIG. 2 is a schematic block diagram illustrating one embodiment of an apparatus that may be used for random access configuration.

FIG. 2 depicts one embodiment of an apparatus 200 that may be used for random access configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: synchronize to a first cell-defining synchronization signal block; and perform random access according to a second random access channel configuration in a bandwidth part of a first serving cell. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212: receives a first cell-defining synchronization signal block on a carrier; receives a first system information message associated with a first serving cell of the first cell-defining synchronization signal block, wherein the first system information message includes a first random access channel configuration; and receives a bandwidth part configuration via a dedicated message from the first serving cell that indicates a bandwidth part configured with a second random access channel configuration. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
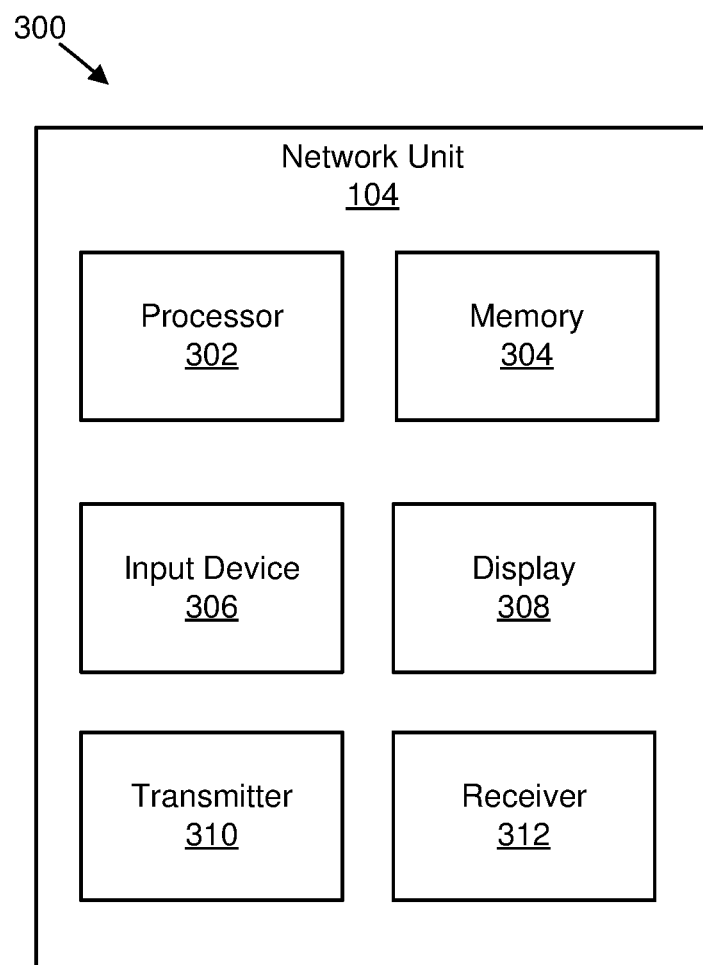
FIG. 3 is a schematic block diagram illustrating one embodiment of an apparatus that may be used for random access configuration.

FIG. 3 depicts one embodiment of an apparatus 300 that may be used for random access configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a first cell-defining synchronization signal block on a carrier; transmits a first system information message associated with a first serving cell of the first cell-defining synchronization signal block, wherein the first system information message includes a first random access channel configuration; and transmits a bandwidth part configuration via a dedicated message from the first serving cell that indicates a bandwidth part configured with a second random access channel configuration, wherein random access is performed according to the second random access channel configuration in the bandwidth part of the first serving cell.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, a BWP may include a group of contiguous PRBs to support reduced UE BW capability, UE BW adaptation, FDM of multiple numerologies, and/or use of a non-contiguous spectrum. In certain embodiments, a connected mode UE may be UE-specifically and/or semi-statically configured with one or more BWPs for a single carrier. In various embodiments, a bandwidth of a BWP may be less than or equal to a maximum UE bandwidth capability, but may be at least as large as a bandwidth of an SSB. In such embodiments, the SSB may include primary synchronization signals, secondary synchronization signals, and/or PBCH. In one embodiment, different UEs' BWPs may fully or partially overlap, and it may be up to an NE (e.g., gNB) to coordinate scheduling of different UEs' BWPs. In some embodiments, configuration parameters of a BWP may include a numerology (e.g., subcarrier spacing), a frequency location (e.g., center frequency), and/or a bandwidth (e.g., number of PRBs). In certain embodiments, a given BWP may or may not contain an SSB.

In various embodiments, multiple SSBs may be transmitted within a bandwidth of a carrier. However, in such embodiments, from a UE perspective, a cell may be associated with a single SSB in the frequency domain, and a cell-defining SSB may have one or more associated essential SIBs. The one or more associated essential SIBS may include RMSI (e.g., system information not included in a MIB but essential for accessing a cell). In some embodiments, a cell-defining SSB may be used for common PRB indexing and/or scrambling.

In certain embodiments, various methods may be used to perform random access within a wideband carrier. In such embodiments, the wideband carrier may refer to a carrier that includes one or more cell-defining SSBs. In some embodiments, various methods may be used to handle UE mobility if a UE changes to a different cell-defining SSB within a wideband carrier.

As used herein, an initial active BWP may be defined by a frequency location, a bandwidth of an RMSI CORESET (e.g., the CORESET in which a PDCCH scheduling a PDSCH carrying the RMSI is transmitted), and/or a numerology of RMSI (e.g., subcarrier spacing and a CP length of a PDCCH scheduling RMSI and a PDSCH carrying RMSI). In various embodiments, a PDSCH delivering RMSI may be confined within an initial active DL BWP.

Moreover, as used herein, an initial active UP BWP may be defined as a BWP in which a UE performs a random access procedure including transmission of one or more random access preambles, a PUSCH for message 3 (e.g., Msg.3), and/or a PUCCH for message 4 (e.g., Msg.4) HARQ feedback during an initial cell selection procedure. In certain embodiments, at least one initial active UL BWP configured per cell-defining SSB is supported from a UE's perspective. As used herein, a cell-defining SSB may be an SSB that corresponds to a specific cell and provides information related to delivery of one or more essential SIBs associated with the specific cell. Furthermore, a non-cell defining SSB may be an SSB that is associated with a specific cell but does not provide information related to delivery of one or more essential SIBs associated with the specific cell. In some embodiments, if a SUL is configured, an additional initial active UL BWP for SUL may be independently configured.

In various embodiments, a default DL BWP of a PCell may be defined as a DL bandwidth part for which a UE performs measurement on a serving cell-defining SSB (e.g., an SSB corresponding to a serving cell) and monitors common DCI (e.g., scheduling information of PDSCH carrying one or more SIBs). In certain embodiments, if a default DL BWP is not configured, the default DL BWP may be an initial active DL BWP. In some embodiments, a UE may switch its active DL BWP to a default DL BWP if a timer expires. In such embodiments, the UE may start the timer at a time in which the UE switches its active DL BWP to a DL BWP other than the default DL BWP and the timer may be started at an initial value at each instance that it successfully decodes a PDCCH to schedule one or more PDSCHs in its active DL BWP.

In one embodiment, a UE may receive RMSI of a serving cell-defining SSB of a wideband carrier. In such an embodiment, the RMSI of the serving cell-defining SSB may include one or more RACH configurations. Furthermore, in such an embodiment, each of the one or more RACH configurations may be associated with each of one or more cell-defining SSBs of the wideband carrier. Moreover, in such an embodiment, the one or more cell-defining SSBs of the wideband carrier may be transmitted on different synchronization signal frequencies within the wideband carrier (e.g., by one or more cooperating TRPs). In some embodiments, the one or more cooperating TRPs may be connected via an ideal or fiber backhaul and/or controlled by a common scheduling unit or a common network entity (e.g., a base station, eNB, gNB). In certain embodiments, a RACH configuration included in RMSI of a serving cell-defining SSB may be associated with more than one cell-defining SSBs of a wideband carrier (e.g., the serving cell-defining SSB, and another cell-defining SSB).

In various embodiments, a RACH configuration may include a PRACH configuration index indicating a PRACH format (e.g., defining a cyclic prefix length, a guard time duration, a preamble sequence length, and/or a number of preamble sequences), a time resource for RACH, a frequency resource for RACH, a high speed flag, a root sequence index, a preamble initial received target power, a zero correlation zone configuration (e.g., together with the high speed flag defining a set of allowed cyclic shifts for a root sequence), a waveform of message 3, a subcarrier spacing of message 3, an RSRP threshold for an SSB (e.g., to select a serving SSB), a preamble power ramping step size, a MAC-contention resolution timer, and/or a random access response window size. In one embodiment, some information elements of one or more RACH configurations may be common, and the common information elements may be signaled only once without duplication in a given RMSI payload. In another embodiment, one or more RACH configurations may be separately and independently configured and/or signaled. In certain embodiments, a network entity (e.g., gNB) may explicitly and/or implicitly indicate to a UE whether a RACH configuration of the one or more RACH configurations (e.g., which is associated with a non-serving cell-defining SSBs of the one or more cell-defining SSBs of a wideband carrier) may be used for CBRA. In such embodiments, if CBRA is not allowed for the UE or CBRA is allowed but not signaled, the UE may assume (or have a default setting) that a RACH configuration associated with a non-serving cell-defining SSB may only be used for CFRA. In various embodiments, information elements of some RACH configurations (e.g., all but one RACH configuration that is associated with a serving cell-defining SSB) may be signaled in system information other than RMSI (e.g., OSI). In certain embodiments, the system information other than RMSI may be signaled independently from the RMSI.

In some embodiments, RMSI of a serving cell-defining SSB may only include a RACH configuration associated with the serving cell-defining SSB. In such an embodiment, a UE may only use the RACH configuration of the serving cell-defining SSB for initial access (e.g., initial cell selection). Moreover, after the UE connects to a cell, the UE may receive other RACH configurations associated with non-serving cell-defining SSBs of one or more cell-defining SSBs of a wideband carrier via dedicated RRC signaling. These dedicated RACH configurations may be included as a part of BWP configuration signaling. In certain embodiments, if a UE is configured with a particular DL/UL BWP via dedicated RRC signaling, the UE may be informed of a RACH configuration associated with a non-serving cell-defining SSB of one or more cell-defining SSBs of a wideband carrier. In such embodiments, the non-serving cell-defining SSB may be transmitted by a TRP that is the same as or different from the TRP transmitting the serving cell-defining SSB and the non-serving cell-defining SSB may be transmitted within a particular DL BWP. In such embodiments, RACH time and/or frequency resources of a RACH configuration may exist within a particular UL BWP.

In one embodiment, a UE may receive an indication of a timing, a frequency, a DL path loss reference SSB, and/or a reference DL reference signal (e.g., CSI-RS) for a dedicated RACH configuration. In some embodiments, even though a dedicated RACH configuration may be associated with a non-serving cell-defining SSB, a gNB may indicate a serving cell-defining SSB as a timing, a frequency, and/or DL path loss reference SSB. In such embodiments, a serving cell-defining SSB and/or non-serving cell-defining SSB may be quasi-co-located. In various embodiments, one or more RACH preambles that a UE sends based on a dedicated RACH configuration may be intended for a TRP transmitting a serving cell-defining SSB and/or monitored by the TRP transmitting the serving cell-defining SSB. In such embodiments, only contention-free random access may be allowed to avoid confusion between two TRPs. In some embodiments, based on a received indication, a UE may: obtain DL timing and/or DL path loss estimates and/or perform random access according to a dedicated RACH configuration.

In certain embodiments, a gNB may indicate whether a UE can perform contention-based random access for a dedicated RACH configuration. In such embodiments, if not indicated, the UE may assume by default that the dedicated RACH configuration is used only for contention-free random access. In some embodiments, if a gNB indicates quasi-co-location between a serving cell-defining SSB and a non-serving cell-defining SSB (e.g., serving and non-serving cell-defining SSBs being transmitted from the same TRP), a UE may assume that contention-based random access is allowed for a dedicated RACH configuration associated with the non-serving cell-defining SSB and may select one of the RACH configurations (e.g., cell-specific or UE-specific) depending on the RACH use cases (e.g., scheduling priority or QoS requirements of arrived UL data). In such embodiments, if quasi-co-location (e.g., between the serving and non-serving cell-defining SSBs) is not indicated but allowance of contention-based random access on the dedicated RACH configuration is indicated (e.g., this may be if one or more RACH preambles sent from a UE according to the dedicated RACH configuration are monitored only by a TRP transmitting the non-serving cell-defining SSB), the UE may choose one of the RACH configurations (e.g., cell-specific or UE-specific) based on a combination of RACH configurations and required preamble transmit power (and/or estimated DL path loss). In one embodiment, if quasi-co-location (e.g., between serving and non-serving cell-defining SSBs) is not indicated but CBRA is allowed on a dedicated RACH configuration, a UE may obtain a DL timing and a DL path loss estimate based on an indicated DL path loss reference SSB and/or DL signal associated with the dedicated RACH configuration. In certain embodiments, if a UE does not receive an indication related to quasi-co-location and does not receive an indication related to allowance of contention-based random access but does receive an indication that a timing, a frequency, and/or a DL path loss reference SSB and/or DL signal for a dedicated RACH configuration is a non-serving cell-defining SSB, the UE may assume that contention-based random access is allowed for the dedicated RACH configuration.

In various embodiments, RMSI may include all RACH configurations associated with all cell-defining SSBs of a wideband carrier, and/or other system information may include all of the RACH configurations associated with all of the non-serving cell-defining SSBs of the wideband carrier. In such embodiments, all of the cell-defining SSBs of the wideband carrier may be transmitted from one TRP, and corresponding RACH resources may be monitored by one TRP (e.g., the same TRP). In one embodiment, a UE uses a RACH configuration of a serving cell-defining SSB for initial access (e.g., initial cell selection). In such an embodiment, once connected, the UE may perform contention-based random access on a RACH configuration of any cell-defining SSB of the wideband carrier. In certain embodiments, each RACH configuration may have different values for some parameters (e.g., a preamble power ramping step size, an initial value of a backoff parameter, etc.) for different RACH prioritization depending on a RACH configuration.

In certain embodiments, RMSI or OSI may include RACH configurations associated with a subset of cell-defining SSBs of a wideband carrier. In such embodiments, RACH configurations associated with remaining cell-defining SSBs of the wideband carrier may be configured to be UE specific for connected mode UEs.

In one embodiment, a UE may change a serving cell-defining SSB by receiving an indication on a change of a default DL BWP. In such embodiments, the serving cell-defining SSB may be transmitted in a default DL BWP. Moreover, a gNB may command or indicate to the UE to change the serving cell-defining SSB without interrupting on-going data communications by transmitting reconfiguration signaling relating to the default DL BWP. In such embodiments, the reconfiguration signaling relating to the default DL BWP may include a POD and a synchronization signal frequency location of a target cell-defining SSB. Furthermore, in such embodiments, if the reconfiguration signaling relating to the default DL BWP does not include information on the target cell-defining SSB, a UE may assume that the serving cell-defining SSB is not changed.

In various embodiments, if one or more cell-defining SSBs (e.g., a first SSB, a second SSB, and/or a third SSB) on different synchronization signal frequencies within a wideband carrier are transmitted by one or more cooperating TRPs (e.g., a first TPR, a second TPR, and/or a third TRP) which may be connected to a common central processing unit or base station, a gNB may change a serving cell-defining SSB of a UE among the one or more cell-defining SSBs of the wideband carrier by reconfiguring the default bandwidth part of the UE.

Figure 4:
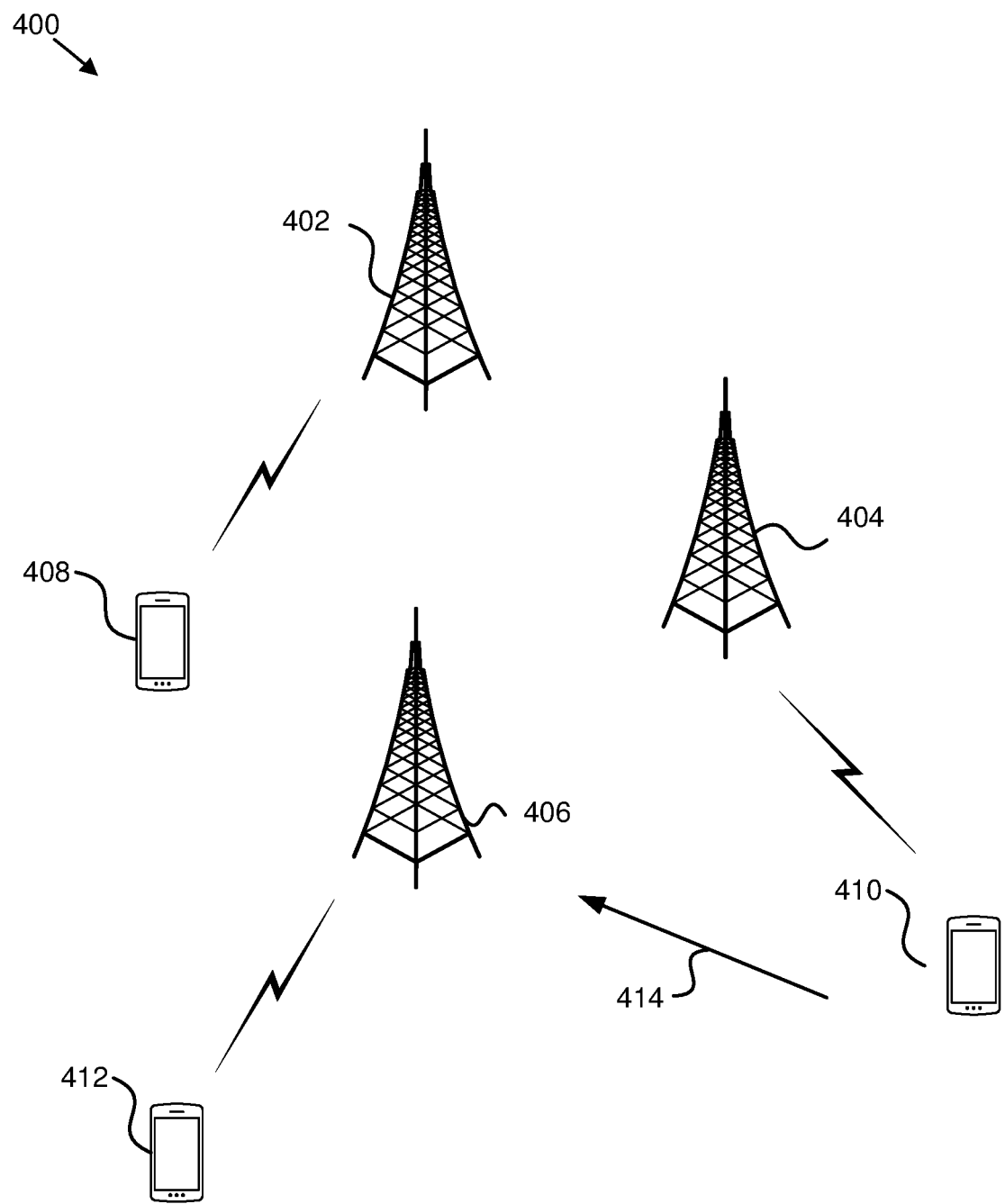
FIG. 4 is a schematic block diagram illustrating one embodiment of a system including multiple TRPs.

FIG. 4 is a schematic block diagram illustrating one embodiment of a system 400 including multiple TRPs. The TRPs may be connected to a common central processing unit or base station. The system 400 includes a first TRP 402 that may transmit a first SSB, a second TRP 404 that may transmit a second SSB, and a third TRP 406 that may transmit a third SSB. The system 400 also includes a first UE 408 that may receive the first SSB from the first TRP 402, a second UE 410 that may receive the second SSB from the second TRP 404, and a third UE 412 that may receive the third SSB from the third TRP 406. In one embodiment, the second UE 410 may move from the second TRP 404 toward the third TRP 406 as illustrated by arrow 414. Accordingly, the second UE 410 may need to be transitioned from using the second SSB to using the third SSB.

Figure 5:
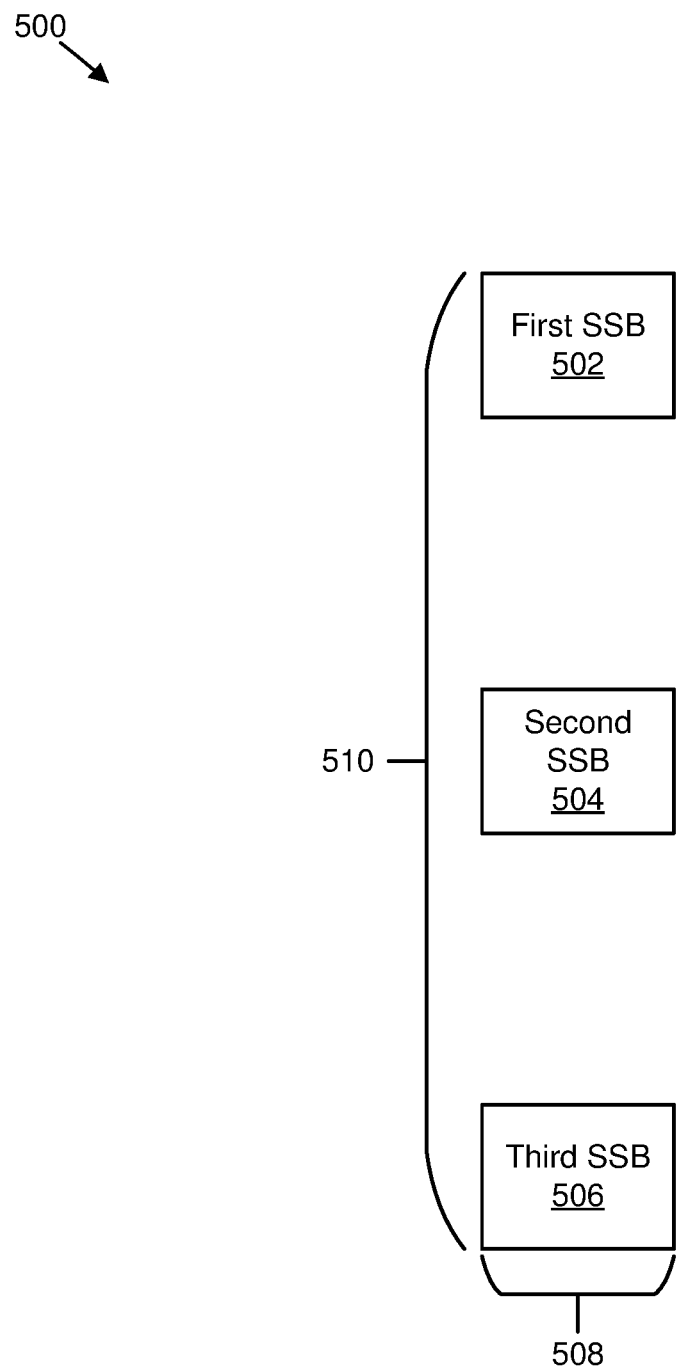
FIG. 5 is a schematic block diagram illustrating one embodiment of SSB transmission in a system having multiple TRPs.

FIG. 5 is a schematic block diagram illustrating one embodiment of SSB transmission in a system 500 having multiple TRPs. The system 500 includes a first SSB 502 (e.g., the first SSB transmitted from the first TRP 402 of FIG. 4), a second SSB 504 (e.g., the second SSB transmitted from the second TRP 404 of FIG. 4), and a third SSB 506 (e.g., the third SSB transmitted from the third TRP 406 of FIG. 4) transmitted during a time period 508 over a frequency range 510. While FIG. 5 illustrates the first SSB 502, the second SSB 504, and the third SSB 506 all transmitted in the same time period 508, in other embodiments, the first SSB 502, the second SSB 504, and/or the third SSB 506 may be transmitted in different time periods. Furthermore, as illustrated, the first SSB 502, the second SSB 504, and the third SSB 506 are all transmitted in different frequency spans (e.g., using different PRBs in the frequency domain) within the frequency range 510.

Figure 6:
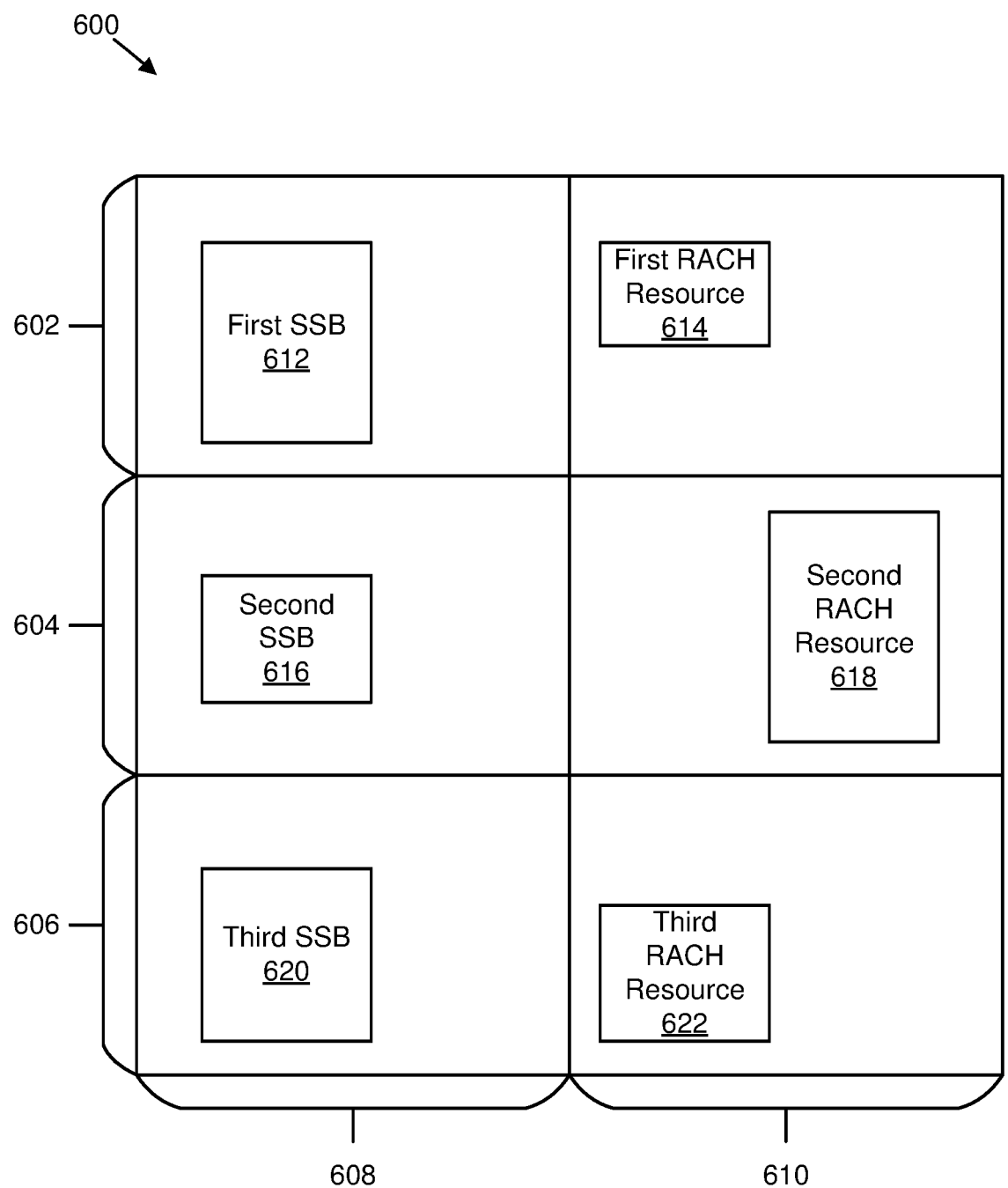
FIG. 6 is a schematic block diagram illustrating one embodiment of SSB transmission and PRACH resource configurations in a system having multiple TRPs.

FIG. 6 is a schematic block diagram illustrating one embodiment of SSB transmission and PRACH resource configuration in a system 600 having multiple TRPs. The system 600 illustrates a first BWP 602 (e.g., an initial and default BWP for the first UE 408 of FIG. 4). The first BWP 602 may have, in one embodiment, a frequency span of 10 MHz and/or a subcarrier-spacing of 30 KHz. The system 600 also illustrates a second BWP 604 (e.g., an initial active BWP for the second UE 410 of FIG. 4 and/or a configured BWP for the first UE 408 of FIG. 4). The second BWP 604 may have, in some embodiments, a frequency span of 20 MHz and/or a subcarrier-spacing of 60 KHz. The system 600 further illustrates a third BWP 606 (e.g., an initial and default BWP for the third UE 412 of FIG. 4 and/or a default BWP for the second UE 410 of FIG. 4). The third BWP 606 may have, in certain embodiments, a frequency span of 10 MHz and/or a subcarrier-spacing of 30 KHz.

The first BWP 602, the second BWP 604, and the third BWP 606 may include a DL slot 608 and an UL slot 610. In the DL slot 608 of the first BWP 602, a first SSB 612 may be received by a UE. The first SSB 612 may be a cell-defining SSB. Moreover, the first SSB 612 may have, in one embodiment, a frequency span (e.g., bandwidth) of 7.2 MHz and/or a subcarrier-spacing of 30 KHz. In the UL slot 610 of the first BWP 602, a first RACH resource 614 may be used for transmissions by the UE. The first RACH resource 614 may be associated with the first SSB 612. Furthermore, the first RACH resource 614 may have a frequency span (e.g., bandwidth) of 1.08 MHz and/or a subcarrier-spacing of 1.25 KHz.

In the DL slot 608 of the second BWP 604, a second SSB 616 may be received by a UE. The second SSB 616 may be a cell-defining SSB. Moreover, the second SSB 616 may have, in one embodiment, a frequency span (e.g., bandwidth) of 7.2 MHz and/or a subcarrier-spacing of 30 KHz. In the UL slot 610 of the second BWP 604, a second RACH resource 618 may be used for transmissions by the UE. The second RACH resource 618 may be associated with the second SSB 616. Furthermore, the second RACH resource 618 may have a frequency span (e.g., bandwidth) of 8.64 MHz and/or a subcarrier-spacing of 60 KHz.

In the DL slot 608 of the third BWP 606, a third SSB 620 may be received by a UE. The third SSB 620 may be a cell-defining SSB. Moreover, the third SSB 620 may have, in one embodiment, a frequency span (e.g., bandwidth) of 7.2 MHz and/or a subcarrier-spacing of 30 KHz. In the UL slot 610 of the third BWP 606, a third RACH resource 622 may be used for transmissions by the UE. The third RACH resource 622 may be associated with the third SSB 620. Furthermore, the third RACH resource 622 may have a frequency span (e.g., bandwidth) of 1.08 MHz and/or a subcarrier-spacing of 1.25 KHz. As may be appreciated, the frequency spans and the subcarrier-spacings described in relation to FIG. 6 are examples only and may be any suitable values.

Returning to FIG. 4, after connection set-up, a default BWP of the first UE 408 and a default BWP of the third UE 412 may remain the same as an initial active BWP of the first UE 408 and the third UE 412, respectively. However, for the second UE 410, as the second UE 410 moves toward the third TRP 406, the second UE 410 may receive a default BWP reconfiguration signaling that may include information relating to a target cell-defining SSB (e.g., the third SSB 620 of FIG. 6) and the second UE 410 may change its serving cell-defining SSB from the second SSB 616 of FIG. 6 to the third SSB 620 of FIG. 6.

Figure 7:
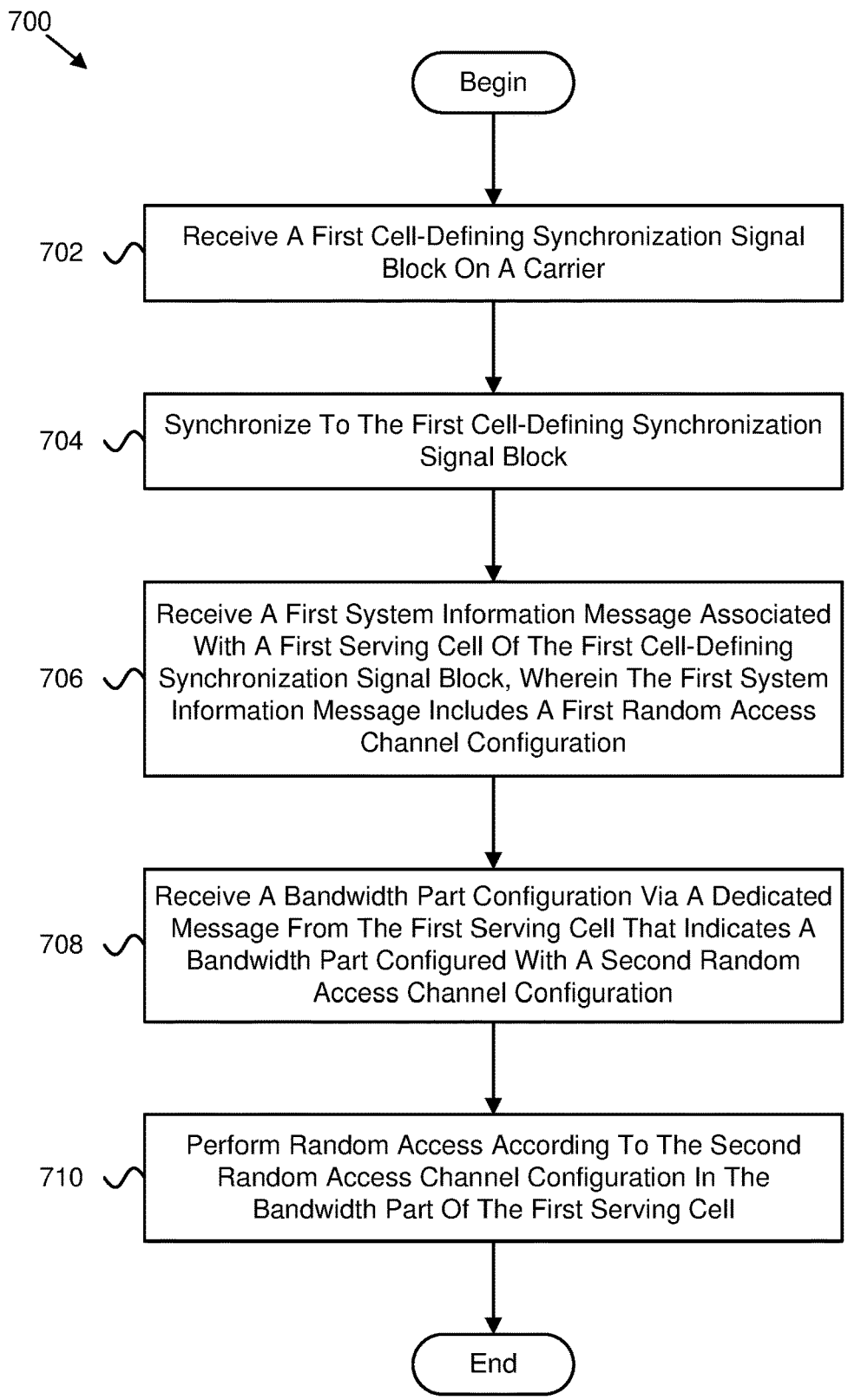
FIG. 7 is a flow chart diagram illustrating one embodiment of a method for random access channel configuration.

FIG. 7 is a flow chart diagram illustrating one embodiment of a method 700 for random access channel configuration. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a first cell-defining synchronization signal block on a carrier. In some embodiments, the method 700 includes synchronizing 704 to the first cell-defining synchronization signal block. In certain embodiments, the method 700 includes receiving 706 a first system information message associated with a first serving cell of the first cell-defining synchronization signal block. In such embodiments, the first system information message includes a first random access channel configuration. In various embodiments, the method 700 includes receiving 708 a bandwidth part configuration via a dedicated message from the first serving cell that indicates a bandwidth part configured with a second random access channel configuration. In one embodiment, the method 700 includes performing 710 random access according to the second random access channel configuration in the bandwidth part of the first serving cell.

In certain embodiments, the second random access channel configuration is associated with a second cell of a second cell-defining synchronization signal block of the carrier. In some embodiments, the first cell-defining synchronization signal block is from a first transmission and reception point and the second cell-defining synchronization signal block is from a second transmission and reception point, and the first and second transmission and reception points: are part of the same entity, are connected via a backhaul, are controlled by a common scheduling unit, or some combination thereof. In various embodiments, the second cell is not a serving cell.

In one embodiment, the method 700 comprises receiving information corresponding to the second cell-defining synchronization signal block, wherein the information corresponding to the second cell-defining synchronization signal block includes a physical cell identity and a synchronization signal frequency location of the second cell-defining synchronization signal block. In certain embodiments, the method 700 comprises: receiving an indication that indicates that the second cell-defining synchronization signal block is associated with the second random access channel configuration and that the first cell-defining synchronization signal block is not quasi-collocated with the second cell-defining synchronization signal block; determining a downlink timing and a downlink path loss estimate based on the second cell-defining synchronization signal block; and transmitting a random access channel on a random access channel resource corresponding to the second random access channel configuration.

In some embodiments, the first system information message includes at least a portion of the second random access channel configuration. In various embodiments, the first system information message includes system information for a connection set-up but not included in a master information block. In one embodiment, the first system information message is received in at least a portion of the carrier on which the first cell-defining synchronization signal block is received.

In certain embodiments, a portion of the carrier on which the first cell-defining synchronization signal block is received comprises a first portion of the carrier and corresponds to a first default downlink bandwidth part of the first serving cell. In some embodiments, the method 700 comprises receiving an indication reconfiguring the first default downlink bandwidth part to a second default bandwidth part associated with a second portion of the carrier and a non-serving cell-defining synchronization signal block in the second portion of the carrier. In various embodiments, the indication indicates to a remote unit to reconfigure the non-serving cell-defining synchronization signal block in the second portion of the carrier as a serving cell-defining synchronization signal block.

In one embodiment, the method 700 comprises receiving a first indication indicating that the second random access channel configuration is associated with a non-serving cell-defining synchronization signal block and allows contention-based random access. In certain embodiments, the method 700 comprises receiving a second indication that indicates whether the non-serving cell-defining synchronization signal block and the first cell-defining synchronization signal block are quasi-collocated.

In some embodiments, the method 700 comprises, in response to not receiving an indication that the second random access channel configuration allows contention-based random access, determining that the second random access channel configuration bars contention-based random access and allows contention free random access on a random access channel resource associated with the second random access channel configuration. In various embodiments, the second random access channel configuration is received in a second system information message of the first serving cell, and the second system information message includes system information not essential for a connection set-up.

Figure 8:
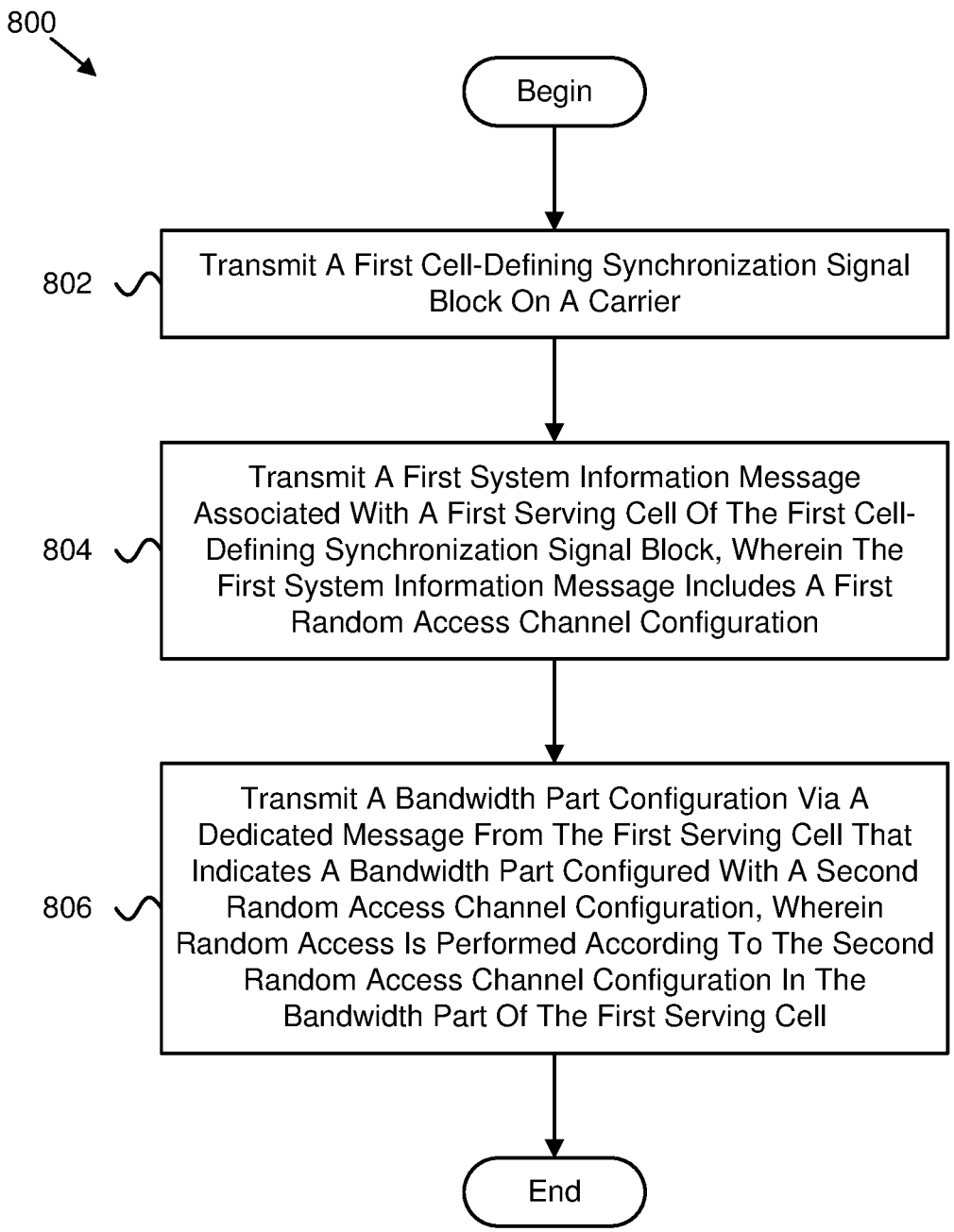
FIG. 8 is a flow chart diagram illustrating another embodiment of a method for random access channel configuration.

FIG. 8 is a flow chart diagram illustrating another embodiment of a method 800 for random access channel configuration. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 a first cell-defining synchronization signal block on a carrier. In some embodiments, the method 800 includes transmitting 804 a first system information message associated with a first serving cell of the first cell-defining synchronization signal block. In such embodiments, the first system information message includes a first random access channel configuration. In certain embodiments, the method 800 includes transmitting 806 a bandwidth part configuration via a dedicated message from the first serving cell that indicates a bandwidth part configured with a second random access channel configuration. In such embodiments, random access is performed according to the second random access channel configuration in the bandwidth part of the first serving cell.

In certain embodiments, the second random access channel configuration is associated with a second cell of a second cell-defining synchronization signal block of the carrier. In some embodiments, the first cell-defining synchronization signal block is from a first transmission and reception point and the second cell-defining synchronization signal block is from a second transmission and reception point, and the first and second transmission and reception points: are part of the same entity, are connected via a backhaul, are controlled by a common scheduling unit, or some combination thereof. In various embodiments, the second cell is not a serving cell.

In one embodiment, the method 800 comprises transmitting information corresponding to the second cell-defining synchronization signal block, wherein the information corresponding to the second cell-defining synchronization signal block includes a physical cell identity and a synchronization signal frequency location of the second cell-defining synchronization signal block. In certain embodiments, the method 800 comprises: transmitting an indication that indicates that the second cell-defining synchronization signal block is associated with the second random access channel configuration and that the first cell-defining synchronization signal block is not quasi-collocated with the second cell-defining synchronization signal block; and receiving a random access channel on a random access channel resource corresponding to the second random access channel configuration. In some embodiments, the first system information message includes at least a portion of the second random access channel configuration.

In various embodiments, the first system information message includes system information for a connection set-up but not included in a master information block. In one embodiment, the first system information message is transmitted in at least a portion of the carrier on which the first cell-defining synchronization signal block is transmitted. In certain embodiments, a portion of the carrier on which the first cell-defining synchronization signal block is transmitted comprises a first portion of the carrier and corresponds to a first default downlink bandwidth part of the first serving cell.

In some embodiments, the method 800 comprises transmitting an indication reconfiguring the first default downlink bandwidth part to a second default bandwidth part associated with a second portion of the carrier and a non-serving cell-defining synchronization signal block in the second portion of the carrier. In various embodiments, the indication indicates to a remote unit to reconfigure the non-serving cell-defining synchronization signal block in the second portion of the carrier as a serving cell-defining synchronization signal block. In one embodiment, the method 800 comprises transmitting a first indication indicating that the second random access channel configuration is associated with a non-serving cell-defining synchronization signal block and allows contention-based random access.

In certain embodiments, the method 800 comprises transmitting a second indication that indicates whether the non-serving cell-defining synchronization signal block and the first cell-defining synchronization signal block are quasi-collocated. In some embodiments, the second random access channel configuration is transmitted in a second system information message of the first serving cell, and the second system information message includes system information not essential for a connection set-up.

In one embodiment, a method comprises: receiving a first cell-defining synchronization signal block on a carrier; synchronizing to the first cell-defining synchronization signal block; receiving a first system information message associated with a first serving cell of the first cell-defining synchronization signal block, wherein the first system information message includes a first random access channel configuration; receiving a bandwidth part configuration via a dedicated message from the first serving cell that indicates a bandwidth part configured with a second random access channel configuration; and performing random access according to the second random access channel configuration in the bandwidth part of the first serving cell.

In certain embodiments, the second random access channel configuration is associated with a second cell of a second cell-defining synchronization signal block of the carrier.

In some embodiments, the first cell-defining synchronization signal block is from a first transmission and reception point and the second cell-defining synchronization signal block is from a second transmission and reception point, and the first and second transmission and reception points: are part of the same entity, are connected via a backhaul, are controlled by a common scheduling unit, or some combination thereof.

In various embodiments, the second cell is not a serving cell.

In one embodiment, the method comprises receiving information corresponding to the second cell-defining synchronization signal block, wherein the information corresponding to the second cell-defining synchronization signal block includes a physical cell identity and a synchronization signal frequency location of the second cell-defining synchronization signal block.

In certain embodiments, the method comprises: receiving an indication that indicates that the second cell-defining synchronization signal block is associated with the second random access channel configuration and that the first cell-defining synchronization signal block is not quasi-collocated with the second cell-defining synchronization signal block; determining a downlink timing and a downlink path loss estimate based on the second cell-defining synchronization signal block; and transmitting a random access channel on a random access channel resource corresponding to the second random access channel configuration.

In some embodiments, the first system information message includes at least a portion of the second random access channel configuration.

In various embodiments, the first system information message includes system information for a connection set-up but not included in a master information block.

In one embodiment, the first system information message is received in at least a portion of the carrier on which the first cell-defining synchronization signal block is received.

In certain embodiments, a portion of the carrier on which the first cell-defining synchronization signal block is received comprises a first portion of the carrier and corresponds to a first default downlink bandwidth part of the first serving cell.

In some embodiments, the method comprises receiving an indication reconfiguring the first default downlink bandwidth part to a second default bandwidth part associated with a second portion of the carrier and a non-serving cell-defining synchronization signal block in the second portion of the carrier.

In various embodiments, the indication indicates to a remote unit to reconfigure the non-serving cell-defining synchronization signal block in the second portion of the carrier as a serving cell-defining synchronization signal block.

In one embodiment, the method comprises receiving a first indication indicating that the second random access channel configuration is associated with a non-serving cell-defining synchronization signal block and allows contention-based random access.

In certain embodiments, the method comprises receiving a second indication that indicates whether the non-serving cell-defining synchronization signal block and the first cell-defining synchronization signal block are quasi-collocated.

In some embodiments, the method comprises, in response to not receiving an indication that the second random access channel configuration allows contention-based random access, determining that the second random access channel configuration bars contention-based random access and allows contention free random access on a random access channel resource associated with the second random access channel configuration.

In various embodiments, the second random access channel configuration is received in a second system information message of the first serving cell, and the second system information message includes system information not essential for a connection set-up.

In one embodiment, an apparatus comprises: a receiver that receives a first cell-defining synchronization signal block on a carrier; and a processor that synchronizes to the first cell-defining synchronization signal block, wherein: the receiver: receives a first system information message associated with a first serving cell of the first cell-defining synchronization signal block, wherein the first system information message includes a first random access channel configuration; and receives a bandwidth part configuration via a dedicated message from the first serving cell that indicates a bandwidth part configured with a second random access channel configuration; and the processor performs random access according to the second random access channel configuration in the bandwidth part of the first serving cell.

In certain embodiments, the second random access channel configuration is associated with a second cell of a second cell-defining synchronization signal block of the carrier.

In some embodiments, the first cell-defining synchronization signal block is from a first transmission and reception point and the second cell-defining synchronization signal block is from a second transmission and reception point, and the first and second transmission and reception points: are part of the same entity, are connected via a backhaul, are controlled by a common scheduling unit, or some combination thereof.

In various embodiments, the second cell is not a serving cell.

In one embodiment, the receiver receives information corresponding to the second cell-defining synchronization signal block, and the information corresponding to the second cell-defining synchronization signal block includes a physical cell identity and a synchronization signal frequency location of the second cell-defining synchronization signal block.

In certain embodiments, the method comprises a transmitter, wherein: the receiver receives an indication that indicates that the second cell-defining synchronization signal block is associated with the second random access channel configuration and that the first cell-defining synchronization signal block is not quasi-collocated with the second cell-defining synchronization signal block; the processor determines a downlink timing and a downlink path loss estimate based on the second cell-defining synchronization signal block; and the transmitter transmits a random access channel on a random access channel resource corresponding to the second random access channel configuration.

In some embodiments, the first system information message includes at least a portion of the second random access channel configuration.

In various embodiments, the first system information message includes system information for a connection set-up but not included in a master information block.

In one embodiment, the first system information message is received in at least a portion of the carrier on which the first cell-defining synchronization signal block is received.

In certain embodiments, a portion of the carrier on which the first cell-defining synchronization signal block is received comprises a first portion of the carrier and corresponds to a first default downlink bandwidth part of the first serving cell.

In some embodiments, the receiver receives an indication reconfiguring the first default downlink bandwidth part to a second default bandwidth part associated with a second portion of the carrier and a non-serving cell-defining synchronization signal block in the second portion of the carrier.

In various embodiments, the indication indicates to the apparatus to reconfigure the non-serving cell-defining synchronization signal block in the second portion of the carrier as a serving cell-defining synchronization signal block.

In one embodiment, the receiver receives a first indication indicating that the second random access channel configuration is associated with a non-serving cell-defining synchronization signal block and allows contention-based random access.

In certain embodiments, the receiver receives a second indication that indicates whether the non-serving cell-defining synchronization signal block and the first cell-defining synchronization signal block are quasi-collocated.

In some embodiments, in response to not receiving an indication that the second random access channel configuration allows contention-based random access, the processor determines that the second random access channel configuration bars contention-based random access and allows contention free random access on a random access channel resource associated with the second random access channel configuration.

In various embodiments, the second random access channel configuration is received in a second system information message of the first serving cell, and the second system information message includes system information not essential for a connection set-up.

In one embodiment, a method comprises: transmitting a first cell-defining synchronization signal block on a carrier; transmitting a first system information message associated with a first serving cell of the first cell-defining synchronization signal block, wherein the first system information message includes a first random access channel configuration; and transmitting a bandwidth part configuration via a dedicated message from the first serving cell that indicates a bandwidth part configured with a second random access channel configuration, wherein random access is performed according to the second random access channel configuration in the bandwidth part of the first serving cell.

In certain embodiments, the second random access channel configuration is associated with a second cell of a second cell-defining synchronization signal block of the carrier.

In some embodiments, the first cell-defining synchronization signal block is from a first transmission and reception point and the second cell-defining synchronization signal block is from a second transmission and reception point, and the first and second transmission and reception points: are part of the same entity, are connected via a backhaul, are controlled by a common scheduling unit, or some combination thereof.

In various embodiments, the second cell is not a serving cell.

In one embodiment, the method comprises transmitting information corresponding to the second cell-defining synchronization signal block, wherein the information corresponding to the second cell-defining synchronization signal block includes a physical cell identity and a synchronization signal frequency location of the second cell-defining synchronization signal block.

In certain embodiments, the method comprises: transmitting an indication that indicates that the second cell-defining synchronization signal block is associated with the second random access channel configuration and that the first cell-defining synchronization signal block is not quasi-collocated with the second cell-defining synchronization signal block; and receiving a random access channel on a random access channel resource corresponding to the second random access channel configuration.

In some embodiments, the first system information message includes at least a portion of the second random access channel configuration.

In various embodiments, the first system information message includes system information for a connection setup but not included in a master information block.

In one embodiment, the first system information message is transmitted in at least a portion of the carrier on which the first cell-defining synchronization signal block is transmitted.

In certain embodiments, a portion of the carrier on which the first cell-defining synchronization signal block is transmitted comprises a first portion of the carrier and corresponds to a first default downlink bandwidth part of the first serving cell.

In some embodiments, the method comprises transmitting an indication reconfiguring the first default downlink bandwidth part to a second default bandwidth part associated with a second portion of the carrier and a non-serving cell-defining synchronization signal block in the second portion of the carrier.

In various embodiments, the indication indicates to a remote unit to reconfigure the non-serving cell-defining synchronization signal block in the second portion of the carrier as a serving cell-defining synchronization signal block.

In one embodiment, the method comprises transmitting a first indication indicating that the second random access channel configuration is associated with a non-serving cell-defining synchronization signal block and allows contention-based random access.

In certain embodiments, the method comprises transmitting a second indication that indicates whether the non-serving cell-defining synchronization signal block and the first cell-defining synchronization signal block are quasi-collocated.

In some embodiments, the second random access channel configuration is transmitted in a second system information message of the first serving cell, and the second system information message includes system information not essential for a connection set-up.

In one embodiment, an apparatus comprises: a transmitter that: transmits a first cell-defining synchronization signal block on a carrier; transmits a first system information message associated with a first serving cell of the first cell-defining synchronization signal block, wherein the first system information message includes a first random access channel configuration; and transmits a bandwidth part configuration via a dedicated message from the first serving cell that indicates a bandwidth part configured with a second random access channel configuration, wherein random access is performed according to the second random access channel configuration in the bandwidth part of the first serving cell.

In certain embodiments, the second random access channel configuration is associated with a second cell of a second cell-defining synchronization signal block of the carrier.

In some embodiments, the first cell-defining synchronization signal block is from a first transmission and reception point and the second cell-defining synchronization signal block is from a second transmission and reception point, and the first and second transmission and reception points: are part of the same entity, are connected via a backhaul, are controlled by a common scheduling unit, or some combination thereof.

In various embodiments, the second cell is not a serving cell.

In one embodiment, the transmitter transmits information corresponding to the second cell-defining synchronization signal block, and the information corresponding to the second cell-defining synchronization signal block includes a physical cell identity and a synchronization signal frequency location of the second cell-defining synchronization signal block.

In certain embodiments, the apparatus comprises a receiver, wherein: the transmitter transmits an indication that indicates that the second cell-defining synchronization signal block is associated with the second random access channel configuration and that the first cell-defining synchronization signal block is not quasi-collocated with the second cell-defining synchronization signal block; and the receiver receives a random access channel on a random access channel resource corresponding to the second random access channel configuration.

In some embodiments, the first system information message includes at least a portion of the second random access channel configuration.

In various embodiments, the first system information message includes system information for a connection set-up but not included in a master information block.

In one embodiment, the first system information message is transmitted in at least a portion of the carrier on which the first cell-defining synchronization signal block is transmitted.

In certain embodiments, a portion of the carrier on which the first cell-defining synchronization signal block is transmitted comprises a first portion of the carrier and corresponds to a first default downlink bandwidth part of the first serving cell.

In some embodiments, the transmitter transmits an indication reconfiguring the first default downlink bandwidth part to a second default bandwidth part associated with a second portion of the carrier and a non-serving cell-defining synchronization signal block in the second portion of the carrier.

In various embodiments, the indication indicates to a remote unit to reconfigure the non-serving cell-defining synchronization signal block in the second portion of the carrier as a serving cell-defining synchronization signal block.

In one embodiment, the transmitter transmits a first indication indicating that the second random access channel configuration is associated with a non-serving cell-defining synchronization signal block and allows contention-based random access.

In certain embodiments, the transmitter transmits a second indication that indicates whether the non-serving cell-defining synchronization signal block and the first cell-defining synchronization signal block are quasi-collocated.

In some embodiments, the second random access channel configuration is transmitted in a second system information message of the first serving cell, and the second system information message includes system information not essential for a connection set-up.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving a system information message associated with a cell-defining synchronization signal block of a serving cell, wherein the system information message includes a first random access channel configuration;
   receiving a bandwidth part configuration of the serving cell via a dedicated message that indicates an uplink bandwidth part configured with a second random access channel configuration different from the first random access channel configuration and a corresponding downlink bandwidth part including a synchronization signal block different from the cell-defining synchronization signal block of the serving cell; and
   performing random access based on the second random access channel configuration in the uplink bandwidth part, when operating based on the synchronization signal block in the downlink bandwidth part.

2. The method of claim 1, wherein the system information message includes essential system information to access a cell that is not included in a master information block of the cell.

3. The method of claim 1, wherein performing the random access comprises performing a contention free random access on a random access channel resource of the second random access channel configuration.

4. The method of claim 3, wherein the random access channel resource is associated with a channel state information reference signal.

5. The method of claim 1, wherein the cell-defining synchronization signal block is from a serving cell, and the method further comprises receiving the cell-defining synchronization signal block for synchronization to the serving cell.

6. The method of claim 5, wherein the cell-defining synchronization signal block is received on a portion of a carrier, and the portion of the carrier is within an initial downlink bandwidth part of the serving cell.

7. The method of claim 6, wherein the system information message is received in at least the portion of the carrier on which the cell-defining synchronization signal block is received.

8. The method of claim 5, wherein the first random access channel configuration is associated with an initial uplink bandwidth part of the serving cell.

9. The method of claim 5, wherein the bandwidth part configuration is a bandwidth part configuration of the serving cell.

10. The method of claim 1, wherein the cell-defining synchronization signal block is a first cell-defining synchronization signal block of a first cell, and the method further comprises receiving information of a second cell-defining synchronization signal block of a second cell, wherein the information of the second cell-defining synchronization signal block includes a physical cell identity and a synchronization signal frequency location of the second cell-defining synchronization signal block.

11. The method of claim 10, wherein the first cell-defining synchronization signal block is within a first portion of a carrier and the second cell-defining synchronization signal block is within a second portion of the carrier different than the first portion of the carrier.

12. The method of claim 10, wherein the second random access channel configuration is associated with the second cell.

13. The method of claim 10, wherein receiving the information comprises receiving an indication that indicates to a remote unit to change a primary cell from the first cell to the second cell.

14. An apparatus comprising:
a receiver that:
  receives a system information message associated with a cell-defining synchronization signal block of a serving cell, wherein the system information message includes a first random access channel configuration; and
  receives a bandwidth part configuration of a serving cell via a dedicated message that indicates an uplink bandwidth part configured with a second random access channel configuration different from the first random access channel configuration and a corresponding downlink bandwidth part including a synchronization signal block different from the cell-defining synchronization signal block of the serving cell; and
a processor that performs random access based on the second random access channel configuration in the uplink bandwidth part, when operating based on the synchronization signal block in the downlink bandwidth part.

15. The apparatus of claim 14, wherein the processor performing the random access comprises the processor performing a contention free random access on a random access channel resource of the second random access channel configuration.

16. The apparatus of claim 14, wherein the random access channel resource is associated with a channel state information reference signal.

17. The apparatus of claim 14, wherein the cell-defining synchronization signal block is from a serving cell, the first random access channel configuration is associated with an initial uplink bandwidth part of the serving cell, and the bandwidth part configuration is a bandwidth part configuration of the serving cell.

18. The apparatus of claim 14, wherein the cell-defining synchronization signal block is a first cell-defining synchronization signal block of a first cell, the receiver receives information of a second cell-defining synchronization signal block of a second cell, and the information of the second cell-defining synchronization signal block includes a physical cell identity and a synchronization signal frequency location of the second cell-defining synchronization signal block.

19. The apparatus of claim 18, wherein the second random access channel configuration is associated with the second cell.

20. The method of claim 1, wherein the random access is performed based on the second random access channel configuration and the synchronization signal block, wherein the synchronization signal block is used for estimating a path loss.

* * * * *